March 10, 1936.  J. McNAUGHTON  2,033,780

DIRECTION SIGNAL FOR AUTOMOBILES

Filed Dec. 20, 1934

INVENTOR.
JOHN. MC. NAUGHTON.

BY  J. Ledermann

ATTORNEY.

UNITED STATES PATENT OFFICE 2,033,780

DIRECTION SIGNAL FOR AUTOMOBILES

John McNaughton, Hicksville, N. Y., assignor of one-fourth to Morris E. Birer, Hempstead, N. Y.

Application December 20, 1934, Serial No. 758,401

1 Claim. (Cl. 116—52)

The main object of this invention is the provision of a movable signal adapted to be mounted on the outside of a vehicle such as an automobile to indicate to the driver of a following vehicle the intention to either stop or to make a turn, the signal being operated in a novel manner.

Another object of the invention is the provision of such a signal operable from within the car by the driver, and which is also adapted to be operated on both of the sides of the vehicle at the same time, if desired.

The above and other objects will become apparent in the description below, in which characters of reference refer to like-named parts in the drawing.

Referring briefly to the drawing, Figure 1 is a fragmentary perspective view of an automobile equipped with the signal.

Figure 1:
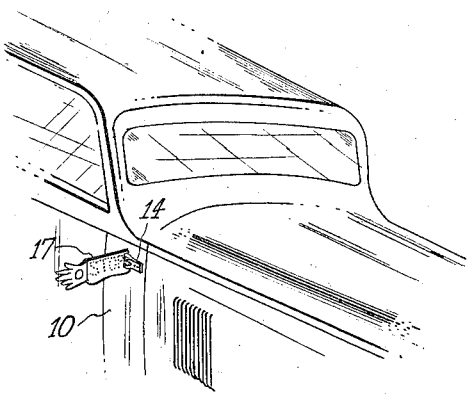

Referring in detail to the drawing, the numeral 10 represents the side of an automobile, and the numeral 11 the dashboard on the inside thereof. An opening 12 is provided through the side 10, and just outside said opening an inclined arm 13 is rigidly mounted by means of a base 14 to the side of the car. A pin 15 passes through the end of the arm 13 and also loosely through the ear 16 of a semaphore 17.

A rod 18 having a knob 19 on the end is slidably mounted in the dashboard 11. Pivotally connected to the other end of the rod 18 is one arm 20 of a bell crank 21 pivotally mounted at 22 on the end of a bracket 23. The other arm 24 of the bell crank 21 is pivoted to a link 25. A second bell crank 26 is pivotally mounted at 27 on the end of a bracket 28, and the shorter arm 29 thereof is pivoted to the end of the link 25. The longer arm 27a of the bell crank 26 is pivoted at its end to one end of a drag link 28. The other end of the link 28 is pivoted to an arm 29 rigid with the semaphore 17 and passing through the opening 12. The operation of the mechanism described is obvious. Upon pulling the knob 19 out into the position shown in Figure 2, the semaphore 17 is extended, as shown in full lines in Figure 2. When the knob 19 is pushed back against the dashboard, the semaphore is swung into the position shown in dotted lines in Figure 2. The shape of the arm 29 permits the semaphore in idle position to lie flush against the side of the car.

Figure 2:
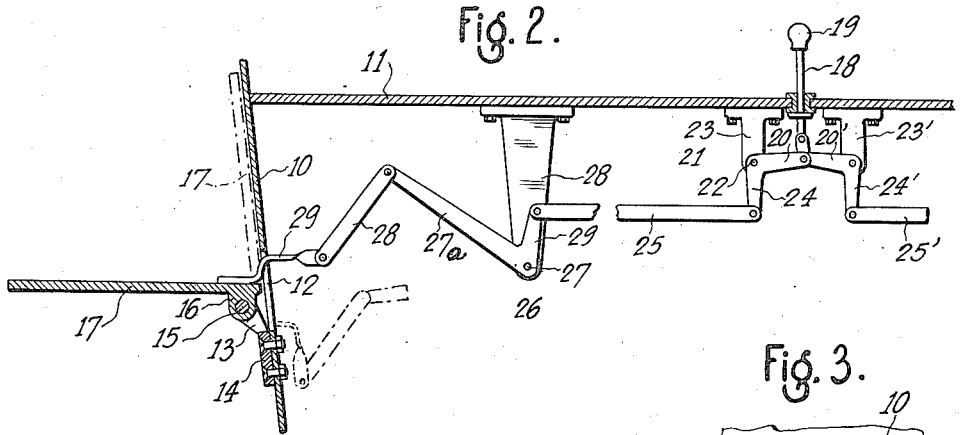
Figure 2 is a cross-sectional view taken on the line 2—2 of Figure 3, with the addition thereto of the structure which would appear if the line 2—2 were continued through the cowl of the vehicle.
Figure 3:
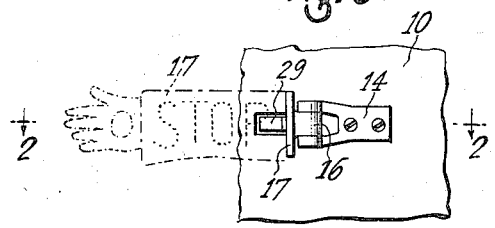
Figure 3 is a fragmentary plan view of the area of the car on which the signal hand is mounted.
Figure 4:
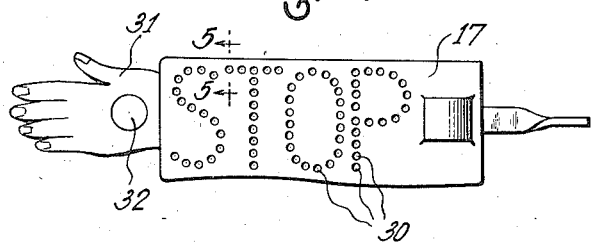
Figure 4 is an enlarged view of the signal arm or semaphore.
Figure 5:
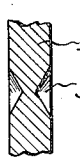
Figure 5 is a cross-sectional view taken on the line 5—5 of Figure 4.

If semaphores 17 are to be mounted on both sides of the car and operated simultaneously, then the linkage described is repeated on the other side, as shown in Figure 2, in part, by the same reference numerals with a' added.

A hand 31 may be provided at the end of the semaphore, with a light-reflecting circular cut-out or a lamp bulb 32 therein. The word "Stop" is preferably formed on the semaphore 17. The manner of forming this word is to arrange a sufficient number of conical cut-outs 30 in proper alignment. The surfaces of these cut-outs are polished so as to serve as efficient reflecting surfaces. The light from the headlights of a following car will, at night, be reflected back to the driver of that car, so that he will readily see the extended signal.

Obviously, the semaphores may be mounted at any other desirable positions on the car, and obviously other modifications in form and structure may be made without departing from the spirit and scope of the invention.

I claim:

In a vehicle direction signal, a semaphore, a base rigidly mounted on the side of the vehicle, the side of the vehicle having an opening therethrough adjacent said base, a rigid arm extending angularly outward from said base and partway across said opening, the end of said arm having a pin passing therethrough, an ear on one side of the end of said semaphore, said pin passing rotatably through said ear to pivotally mount the semaphore on the end of said arm, an arm having one end attached to the pivoted end of the semaphore on the side thereof opposite said ear, the central portion of said arm normally lying and being movable within said opening, and means operable within the vehicle to push or retract said pivoted end of said arm, pushing of said arm causing the semaphore to be extended at substantially right angles to the side of the vehicle, retracting said arm causing the semaphore to be rotated into position flush against the side of the vehicle.

JOHN McNAUGHTON.